(12) United States Patent
Kim et al.

(10) Patent No.: US 11,121,395 B2
(45) Date of Patent: Sep. 14, 2021

(54) BATTERY MODULE WITH MOVABLE END PLATE RESPONSIVE TO CELL SWELLING AND BATTERY PACK INCLUDING SAME

(71) Applicant: LG CHEM, LTD., Seoul (KR)

(72) Inventors: Dong-Yeon Kim, Daejeon (KR);
Jin-Hak Kong, Daejeon (KR);
Yong-Seok Choi, Daejeon (KR);
Jee-Soon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 41 days.

(21) Appl. No.: 16/477,693

(22) PCT Filed: Jul. 17, 2018

(86) PCT No.: PCT/KR2018/008090
§ 371 (c)(1),
(2) Date: Jul. 12, 2019

(87) PCT Pub. No.: WO2019/054619
PCT Pub. Date: Mar. 21, 2019

(65) Prior Publication Data
US 2019/0363392 A1 Nov. 28, 2019

(30) Foreign Application Priority Data
Sep. 18, 2017 (KR) .................. 10-2017-0119764

(51) Int. Cl.
*H01M 10/04* (2006.01)
*H01M 50/209* (2021.01)

(52) U.S. Cl.
CPC ..... *H01M 10/0481* (2013.01); *H01M 50/209* (2021.01); *H01M 2200/20* (2013.01); *H01M 2220/30* (2013.01)

(58) Field of Classification Search
None
See application file for complete search history.

(56) References Cited

U.S. PATENT DOCUMENTS

| 2003/0017387 | A1 | 1/2003 | Marukawa et al. |
| 2010/0300601 | A1 | 12/2010 | Nakanishi et al. |
| 2011/0262799 | A1 | 10/2011 | Kim |
| 2014/0242427 | A1 | 8/2014 | Tanaka et al. |

(Continued)

FOREIGN PATENT DOCUMENTS

| CN | 106463669 A1 | 2/2017 |
| CN | 209357789 U | 9/2019 |

(Continued)

OTHER PUBLICATIONS

English Machine Translation of DE102010012930 (Year: 2010).*

(Continued)

*Primary Examiner* — Lucas J. O'Donnell
(74) *Attorney, Agent, or Firm* — Birch, Stewart, Kolasch & Birch, LLP

(57) ABSTRACT

A battery module including a plurality of battery cells stacked on one another, a casing configured to surround the battery cell stack, and an elastic member coupled to an inner side of the casing while avoiding an interference with the battery cells so that a uniform pressure is formed at the battery cells when swelling occurs at the battery cells is provided.

10 Claims, 4 Drawing Sheets

(56) References Cited

U.S. PATENT DOCUMENTS

| | | |
|---|---|---|
| 2017/0054119 A1 | 2/2017 | Lee |
| 2017/0214009 A1 | 7/2017 | Ha et al. |
| 2019/0044113 A1 | 2/2019 | Wagner et al. |

FOREIGN PATENT DOCUMENTS

| | | |
|---|---|---|
| DE | 102010012930 A1 | 9/2011 |
| JP | H07-122252 A | 5/1995 |
| JP | 2000-048867 A | 2/2000 |
| JP | 2003-036830 A | 2/2003 |
| JP | 2010-040295 A | 2/2010 |
| JP | 2012-248374 A | 12/2012 |
| JP | 2013-26090 A | 2/2013 |
| JP | 2014-165102 A | 9/2014 |
| JP | 2014-175078 A | 9/2014 |
| JP | 2016-085895 A | 5/2016 |
| JP | 2017-004693 A | 1/2017 |
| KR | 10-2011-0117585 A | 10/2011 |
| KR | 10-2016-0133245 A | 11/2016 |
| KR | 10-2016-0135538 A | 11/2016 |
| WO | WO 2014/167019 A1 | 10/2014 |
| WO | WO 2017/133856 A1 | 8/2017 |

OTHER PUBLICATIONS

European Search Report dated May 29, 2020 in corresponding Application No. 18855368.9.
International Search Report for PCT/KR2018/008090 (PCT/ISA/210) dated Oct. 23, 2018, with English translation.
Source: Free encyclopedia "Wikipedia", Pascal's Principle, Jun. 10, 2021 (Search Date), URL https://ja.wikipedia.org/wiki%E3%83%E3%82%B9%E3%82%AB%E3%83%AB%E3%81%AE%E5%8E%9F%E7%90%86.

* cited by examiner

BATTERY MODULE WITH MOVABLE END PLATE RESPONSIVE TO CELL SWELLING AND BATTERY PACK INCLUDING SAME

TECHNICAL FIELD

The present application claims priority to Korean Patent Application No. 10-2017-0119764 filed on Sep. 18, 2017 in the Republic of Korea, the disclosures of which are incorporated herein by reference.

The present disclosure relates to a battery module and a battery pack including the battery module, and more particularly, to a battery module for allowing a uniform pressure to be applied to battery cells when swelling occurs at the battery cells and a battery pack including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

FIG. 1(a) is a partial side sectioned view showing a conventional battery module, and FIG. 1(b) is a partial side sectioned view showing that a non-uniform is formed at a battery cell and an end plate since swelling occurs at the battery cell in the conventional battery module.

Referring to FIGS. 1(a) and 1(b), a plurality of battery cells 2 may be stacked in a battery module 1. However, during charging and discharging of the battery cells 2, gas may be generated inside the battery cells 2, and the swelling phenomenon in which the battery cell 2 expands and contracts due to the generated gas may be repeated. Meanwhile, the battery cell 2 is in contact with an end plate 3 at one end, and an edge portion of the end plate 3 is connected to upper and lower end plates 4, 5 and supported by the upper and lower end plates 4, 5, thereby having relatively higher rigidity than a center portion of the end plate 3. Thus, the end plate 3 presses the battery cells 2 more at the edge portion of the end plate 3, compared to the center portion of the end plate 3. That is, expansion occurs smoothly at the center portion of the battery cell 2, which is pressurized with relatively smaller pressure, compared to the edge portion of the battery cell 2 which is pressurized with a relatively large pressure. Thus, as shown in FIG. 1(b), when swelling occurs at the battery cell 2, the center portion of the battery cell 2 is inflated more than the edge portion of the battery cell 2. In this regard, showing the arrows in FIG. 1(b), the pressure is distributed non-uniformly, namely such that the pressure increases from the center portion of the end plate 3 to the edge portion of the end plate 3. That is, since the battery cell 2 is not inflated at the edge portion of the end plate 3, the pressure is applied thereto excessively.

However, if pressure is distributed non-uniformly at the battery cell 2 when swelling occurs at the battery cell 2, a sudden death phenomenon occurs so that the performance of the battery cell 2 is deteriorated and the electrical connection is interrupted instantaneously.

DISCLOSURE

Technical Problem

The present disclosure is directed to providing a battery module, which may prevent a sudden death phenomenon from being generated at battery cells by allowing a uniform pressure to be applied to the battery cells when swelling occurs at the battery cells, and a battery pack including the battery module.

In addition, the present disclosure is directed to providing a battery module, which allows a pressure applied to the battery cells to be suitably adjusted when the battery module is designed, and a battery pack including battery module.

Technical Solution

In one aspect of the present disclosure, there is provided a battery module, comprising: a battery cell stack having a plurality of battery cells stacked on one another; a casing configured to surround the battery cell stack; and an elastic member coupled to an inner side of the casing while avoiding an interference with the battery cells so that a uniform pressure is formed at the battery cells when swelling occurs at the battery cells.

Also, the casing may be formed by coupling a plurality of plates and the elastic member may be provides as a plurality of springs, and the plurality of springs may be coupled to edge portions of two plates of the plurality of plates disposed at opposite sides of the casing.

In addition, the plurality of springs may include four springs, the plurality of plates may include six plates, and the casing may have a hexahedral shape of which the six plates are coupled, and the four springs are coupled to four edge portions of the two plates at opposite ends of the casing.

Also, a first plate of the two plates at opposite sides of the casing is disposed to be movable within the casing, and the plurality of springs may be coupled to the first plate.

In addition, the first plate may be disposed to be spaced apart from a second plate of the plurality of plates that is disposed at a predetermined location based on a moving direction of the first plate, and the first plate and the second plate may come into contact with each other when the first plate moves.

Also, at least one of a coupling protrusion and a coupling groove may be formed at each of the first plate and the second plate, respectively, such that the coupling protrusions of the first and second plates are configured to engage the coupling grooves of the first and second plates.

Also, a third plate of the plurality of plates may be fixed relative to the second plate and the plurality of springs may be coupled to the third plate.

Meanwhile, in another aspect of the present disclosure, there is also provided a battery pack including the battery module described above, and there is also provided a vehicle including the battery module.

Advantageous Effects

According to the embodiments of the present disclosure, it is possible to prevent a sudden death phenomenon from being generated at battery cells by allowing a uniform pressure to be applied to the battery cells by means of an elastic member when swelling occurs at the battery cells.

In addition, it is possible to allow a pressure applied to the battery cells to be suitably controlled when the battery module is designed, by adjusting a spring constant.

BEST MODE

Figure 1A:
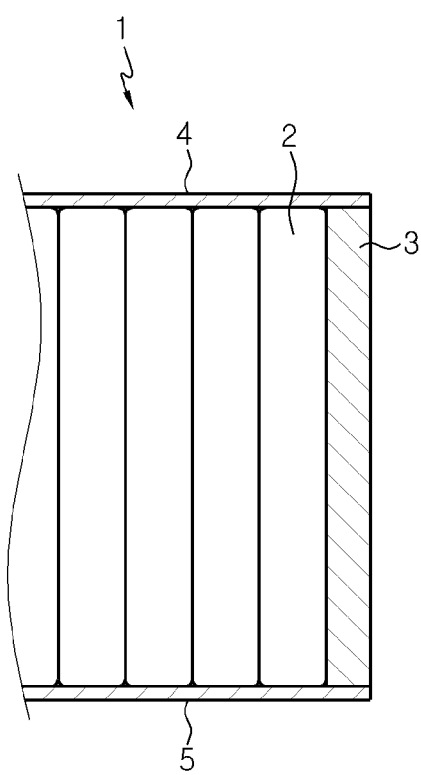
FIG. 1(a) is a partial side sectioned view showing a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
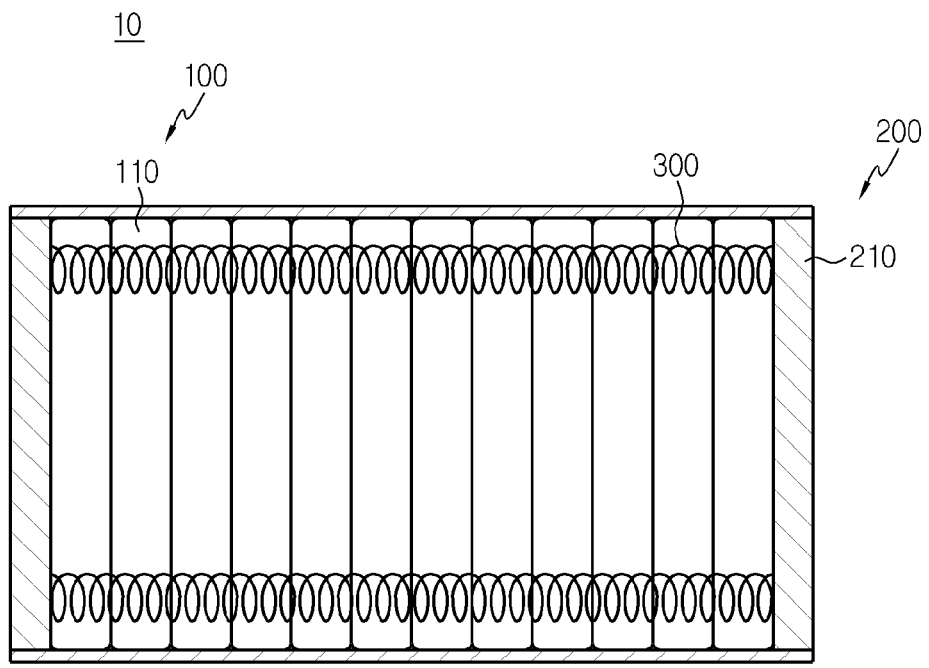
FIG. 2 is a schematic cross-sectioned view showing a battery module according to the first embodiment of the present disclosure before cell swelling occurs.
Figure 3:
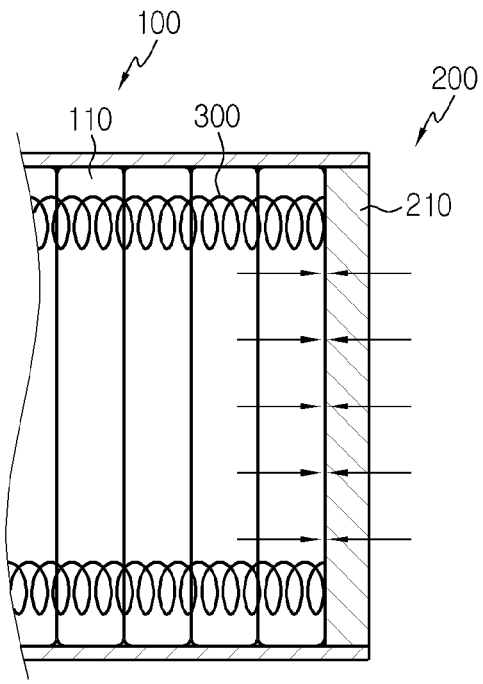
FIG. 3 is a schematic cross-sectioned view showing the battery module according to the first embodiment of the present disclosure when cell swelling occurs.

FIG. 2 is a schematic cross-sectioned view showing a battery module according to the first embodiment of the present disclosure before cell swelling occurs, and FIG. 3 is a schematic cross-sectioned view showing the battery module according to the first embodiment of the present disclosure when cell swelling occurs.

Referring to FIGS. 2 and 3, a battery module 10 according to the first embodiment of the present disclosure includes a battery cell stack 100, a casing 200, and an elastic member 300.

The battery cell stack 100 includes a plurality of battery cells 110 having electrode leads. The electrode lead provided at the battery cell 110 is a type of terminal that is exposed to the outside and connected to an external device and may be made of a conductive material. The electrode lead may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. The electrode lead may be electrically coupled to a bus bar. The battery cell 110 may be configured such that a plurality of unit cells arranged in the order of a positive electrode plate, a separator and a negative electrode plate or bi-cells arranged in the order of a positive electrode plate, a separator, a negative electrode plate, a separator, a positive electrode plate, a separator and a negative electrode plate are stacked appropriate for the battery capacity.

The battery cell stack 100 may be configured such that the plurality of battery cells 110 are stacked on one another. Here, the battery cell 110 may have various structures, and the plurality of battery cells 110 may be stacked in various ways.

The battery cell stack 100 may include a plurality of cartridges (not shown) for accommodating the battery cells 110, respectively. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The casing 200 may accommodate the battery cell stack 100, or the cartridge assembly including the battery cell stack 100. The casing 200 entirely surrounds the battery cell stack 100 or the plurality of cartridge assemblies, thereby protecting the battery cell stack 100 or the cartridge assembly from external vibrations or shocks.

The casing 200 may be formed in a shape corresponding to the battery cell stack 100 or the cartridge assembly. For example, if the battery cell stack 100 or the cartridge assembly has a hexahedral shape, the casing 200 may have a hexahedral shape corresponding thereto. The casing 200 may be manufactured, for example, by bending a metal plate, or may be manufactured by plastic injection. In addition, the casing 200 may be manufactured integrally, or may be manufactured separately. The casing 200 may have a perforation portion (not shown) through which the connector element or the terminal element, explained above, may be exposed to the outside. That is, the connector element or the terminal element may be electrically connected to a predetermined external component or member, and the penetration portion may be formed in the casing 200 so that the electrical connection is not obstructed by the casing 200.

The casing 200 may be formed by coupling a plurality of end plates 210. Here, the number of the end plates 210 may be variously selected. For example, the casing 200 may have a hexahedral structure where six end plates 210 are coupled. However, the casing 200 does not necessarily have to be configured using six end plates 210, and the number of the end plates 210 may be variously selected. Also, the shape of the casing 200 is not limited to the hexahedral shape, and the shape of the casing 200 may be variously selected. However, hereinafter, for the sake of convenience of explanation, the following description will be based the case where the casing 200 has a hexahedral shape formed by six end plates 210.

Figure 1B:
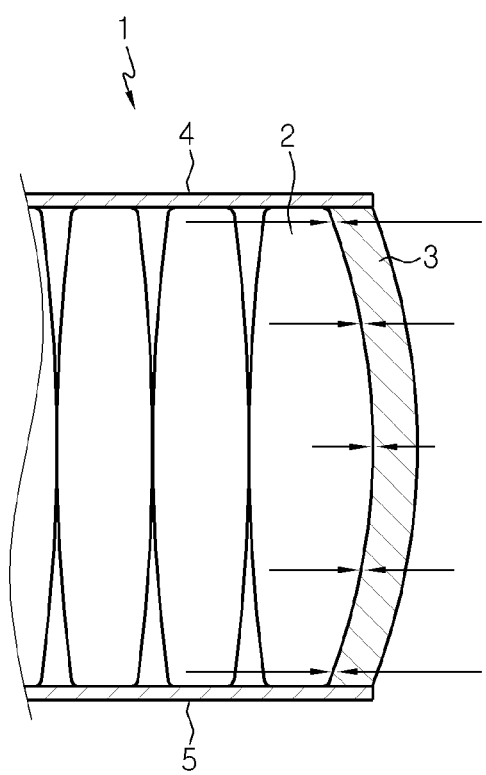
FIG. 1(b) is a partial side sectioned view showing that a non-uniform pressure is formed at a battery cell and an end plate since swelling occurs at the battery cell in the conventional battery module.

The elastic member 300 is coupled to an inner side of the casing 200 while avoiding an interference with the battery cell 110 so that a uniform pressure may be formed at the battery cell 110 when swelling occurs at the battery cell 110. Referring to FIG. 2, here, the elastic member 300 may be provided variously, for example using a plurality of springs. In addition, the plurality of springs may be coupled to edge portions of the end plates 210 respectively disposed at both ends of the hexahedral casing 200. The elastic member 300 may be provided using, for example, four springs and coupled to four edge portions of the end plates 210 at both ends of the casing 200. If the plurality of springs are respectively coupled to the end plates 210 at both ends of the casing 200 as above, a uniform force may be provided to the battery cells 110 interposed between the end plates 210 at both ends of the casing 200. That is, as described above, referring to FIGS. 1(a) and 1(b), in the conventional battery cell 2, when swelling occurs at the battery cell 2 occurs, the center portion of the battery cell 2 is inflated more than the edge portion of the battery cell 2, and thus the pressure is distributed non-uniformly at the battery cells when swelling occurs at the battery cells 2, thereby causing a sudden death phenomenon that deteriorates the performance of the battery cells 2 and instantaneously interrupting the electrical connection. However, in the battery module 10 according to the first embodiment of the present disclosure, referring to FIG. 2, the springs are respectively coupled to the edge portions of the end plates 210, which correspond to the edge portions of the battery cells 110 to which a larger pressure is applied, compared to the center portion of the battery cells 110, and an elastic force is provided to the edge portions of the end plates 210. Thus, when swelling occurs at the battery cell 110, a uniform pressure distribution may be formed as shown in FIG. 3, thereby preventing a sudden death phenomenon from occurring at the battery cell 110.

Meanwhile, if the elastic member 300 is provided using springs, the spring constant may be appropriately adjusted. Accordingly, the pressure applied to the battery cells 110 may be appropriately adjusted in designing the battery module 10 so that a pressure is applied to the battery cells 110 in a level desired by a user.

Hereinafter, the operation and effect of the battery module 10 according to the first embodiment of the present disclosure will be described with reference to the drawings.

Referring to FIGS. 2 and 3, the battery cell stack 100 is accommodated in the casing 200, and the plurality of springs provided in the elastic member 300 are coupled to an inner edge portion of the casing 200. In addition, when swelling occurs at the battery cell 110, the elastic force of the springs is applied to the edge portion of the end plate 210, to which a relatively large pressure is applied in comparison to the center portion of the end plate 210. Accordingly, a uniform pressure distribution may be formed over the entire regions from the edge portions of the end plates 210 to the center portion of the end plates 210.

Figure 4:
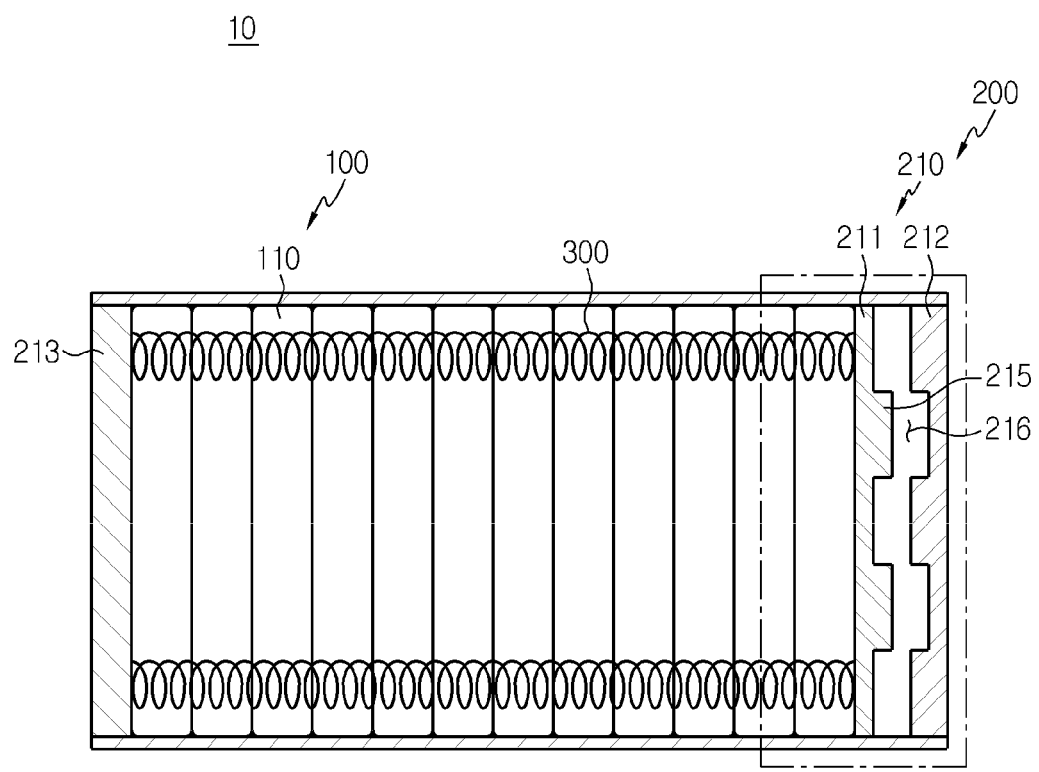
FIG. 4 is a schematic cross-sectioned view showing a battery module according to the second embodiment of the present disclosure before cell swelling occurs.
Figure 5A:
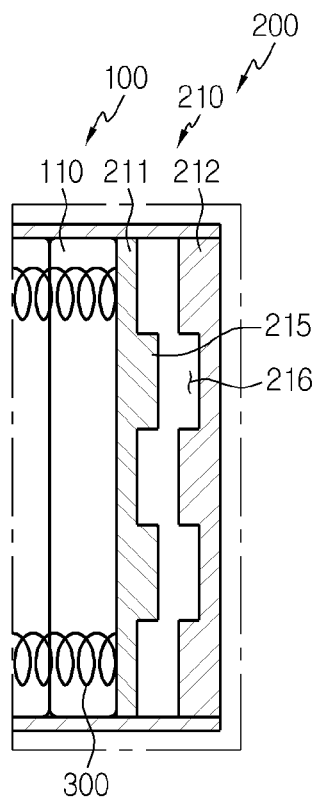
FIGS. 5(a) and 5(b) are schematic cross-sectioned views showing that a first end plate moves to contact a second end plate when cell swelling occurs at the battery module according to the second embodiment of the present disclosure.
Figure 5B:
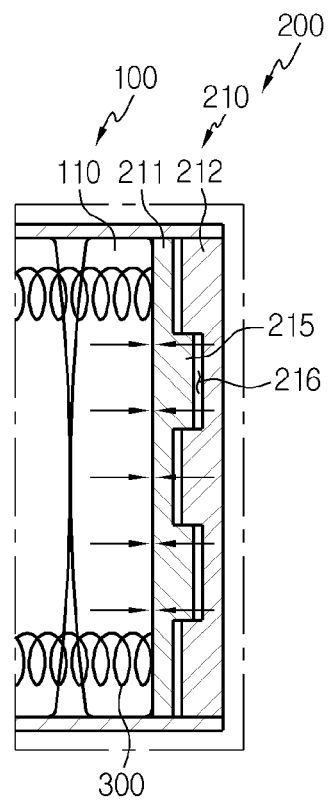

FIG. 4 is a schematic cross-sectioned view showing a battery module according to the second embodiment of the present disclosure before cell swelling occurs, and FIGS. 5(a) and 5(b) are schematic cross-sectioned views showing that a first end plate moves to contact a second end plate when cell swelling occurs at the battery module according to the second embodiment of the present disclosure.

Hereinafter, the function and effect of a battery module 10 according to the second embodiment according to the present disclosure will be described with reference to the drawings, but features common to the battery module 10 according to the first embodiment of the present disclosure will not be described again in detail.

In the second embodiment of the present disclosure, a first end plate 211 may move to contact a second end plate 212, different from the first embodiment.

Referring to FIG. 4, one fixed third end plate 213 is installed at one end of the casing 200, and a first end plate 211 movably provided and a second end plate 212 spaced apart from the first end plate 211 are installed at the other end of the casing 200. Here, the first end plate 211 is disposed between the third end plate 213 fixed at one end of the casing 200 and the second end plate 212 to be movable therein, and a plurality of springs are coupled to the first end plate 211 and the third end plate 213, respectively. The first end plate 211 may be provided to be movable toward the second end plate 212, and when swelling occurs at the battery cell 110, the first end plate 211 may move to contact the second end plate 212. Here, a coupling protrusion 215 and a coupling groove 216, which may be engaged with each other, are formed at the first end plate 211 and the second end plate 212, respectively. When the first end plate 211 moves toward the second end plate 212 since swelling occurs at the battery cell 110, if the coupling protrusion 215 and the coupling groove 216 respectively formed at the first end plate 211 and the second end plate 212 are engaged with each other, the contact portion between the first end plate 211 and the second end plate 212 may be continuously maintained. Thus, a uniform pressure distribution is formed over the entire region from the edge portions of the end plate 210 to the center portion of the end plate 210, and also the uniform pressure distribution may be continuously maintained.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module and a battery pack including the battery module and is particularly applicable to industries associated with a secondary battery.

What is claimed is:

1. A battery module, comprising:
a battery cell stack having a plurality of battery cells stacked on one another;
a casing configured to surround the battery cell stack formed by coupling a plurality of plates, the plurality of plates including a first end plate and a second end plate, the first end plate and second end plate being fixed by at least two side plates extending between and coupled to the first end plate and second end plate, the first end plate and second end plate forming an exterior surface of the casing;
a third end plate between the battery cell stack and the second end plate, the third end plate movable toward and away from the second end plate, the third end plate configured to engage the second end plate; and
an elastic member coupled to an inner side of each of the first end plate and third end plate while avoiding an interference with the battery cells so that a uniform pressure is formed at the battery cells when swelling occurs at the battery cells.

2. The battery module according to claim 1, wherein the elastic member is provided as a plurality of springs, and the plurality of springs are coupled to edge portions of the first end plate and the third end plate disposed at opposite sides of the casing.

3. The battery module according to claim 2, wherein the plurality of springs includes four springs, wherein the plurality of plates includes six plates, and wherein the casing has a hexahedral shape of which the six plates are coupled, and the four springs are coupled to four edge portions of the first end plate and the third end plate.

4. The battery module according to claim 1, wherein the third end plate is disposed to be spaced apart from the second end plate that is disposed at a predetermined location based on a moving direction of the third end plate, and the second end plate and third end plate are configured to come into contact with each other when the third end plate moves to the predetermined location.

5. A battery module, comprising:
a battery cell stack having a plurality of battery cells stacked on one another;
a casing configured to surround the battery cell stack; and
an elastic member coupled to an inner side of the casing while avoiding an interference with the battery cells so that a uniform pressure is formed at the battery cells when swelling occurs at the battery cells,
wherein the casing is formed by coupling a plurality of plates,
wherein the elastic member is provided as a plurality of springs, and the plurality of springs are coupled to edge portions of two plates of the plurality of plates disposed at opposite sides of the casing,
wherein a first plate of the two plates at opposite sides of the casing is disposed to be movable within the casing, and the plurality of springs are coupled to the first plate,
wherein the first plate is disposed to be spaced apart from a second plate that is disposed at a predetermined location based on a moving direction of the first plate, and the first plate and the second plate are configured to come into contact with each other when the first plate moves to the predetermined location, and
wherein at least one of a coupling protrusion and a coupling groove is formed at each of the first plate and the second plate, respectively, such that the coupling protrusions of the first and second plates are configured to engage the coupling grooves of the first and second plates.

6. A battery pack, comprising a battery module according to claim 1.

7. A vehicle, comprising a battery module according to claim 1.

8. The battery module according to claim 1, wherein the elastic member is above a bottom edge of the battery cell stack and below a top edge of the battery cell stack.

9. The battery module according to claim 1, wherein the elastic member is a spring, the length of the spring being equal to a distance between the first end plate and third end plate.

10. The battery module according to claim 5, wherein the elastic member is above a bottom edge of the battery cell stack and below a top edge of the battery cell stack.

* * * * *